United States Patent
Roy et al.

(10) Patent No.: US 12,483,457 B2
(45) Date of Patent: Nov. 25, 2025

(54) METHOD AND APPARATUS FOR BANDWIDTH DETECTION IN WIRELESS NETWORKS

(71) Applicant: NXP USA, Inc., Austin, TX (US)

(72) Inventors: Sayak Roy, Kolkata (IN); Ankit Sethi, Pune (IN); Rihua Wei, Fremont, CA (US); Hanchao Yang, Foster City, CA (US); Sudhir Srinivasa, Los Gatos, CA (US); Tsunglun Yu, Cupertino, CA (US)

(73) Assignee: NXP USA, Inc., Austin, TX (US)

( * ) Notice: Subject to any disclaimer, the term of this patent is extended or adjusted under 35 U.S.C. 154(b) by 295 days.

(21) Appl. No.: 18/352,699

(22) Filed: Jul. 14, 2023

(65) Prior Publication Data

US 2024/0388492 A1 Nov. 21, 2024

(30) Foreign Application Priority Data

May 19, 2023 (IN) ............................ 202341035107

(51) Int. Cl.
*H04L 27/26* (2006.01)

(52) U.S. Cl.
CPC ...... *H04L 27/2666* (2013.01); *H04L 27/2657* (2013.01); *H04L 27/2663* (2013.01)

(58) Field of Classification Search
CPC ............. H04L 27/2666; H04L 27/2675; H04L 27/2663; H04L 27/2657; H04L 27/2603
See application file for complete search history.

(56) References Cited

U.S. PATENT DOCUMENTS 9,888,496 B1 2/2018 Zheng et al.
10,219,271 B1* 2/2019 Hedayat ................ H04L 5/0055
(Continued)

FOREIGN PATENT DOCUMENTS

| CN | 105721370 B | 6/2016 |
| CN | 107360113 B | 11/2019 |
| CN | 111770524 A | 10/2020 |

OTHER PUBLICATIONS

IEEE, "IEEE P802.11ax/D8.0, Draft Standard for Information technology—Telecommunications and information exchange between systems Local and metropolitan area networks—Specific requirements, Part 11: Wireless LAN Medium Access Control (MAC) and Physical Layer (PHY) Specifications." Oct. 2020, relevant pp. 1, 645-648 and 658.

(Continued)

*Primary Examiner* — Congvan Tran

(57) ABSTRACT

A receiver receives a wireless signal comprising a plurality of fields including a legacy short training field (L-STF), legacy long training field (L-LTF), and legacy signal (L-SIG) field transmitted to a plurality of antenna of the receiver. For each sub-band in a receiver bandwidth and when samples of the L-STF is received, a first angle based autocorrelation is performed to determine a group of sub-bands which maximize a magnitude based on the first autocorrelations for one or more sub-bands. For each sub-band in the receiver bandwidth and when samples of the L-LTF is received, a second angle based autocorrelation is then performed to refine the crude bandwidth pattern estimate. One or more signal fields and one or more data fields of the received signal are decoded based on the refined bandwidth pattern estimate.

20 Claims, 6 Drawing Sheets

(56) References Cited

U.S. PATENT DOCUMENTS

| | | | |
|---|---|---|---|
| 10,681,679 B1 | 6/2020 | Cheng et al. | |
| 10,728,865 B1 | 7/2020 | Cao et al. | |
| 10,749,712 B2 | 8/2020 | Wu et al. | |
| 11,770,197 B2* | 9/2023 | Zhang | H04B 17/309 |
| | | | 382/103 |
| 2011/0013721 A1* | 1/2011 | Liao | H04L 27/2621 |
| | | | 375/295 |
| 2017/0373901 A1* | 12/2017 | Lim | H04W 48/12 |
| 2021/0041549 A1* | 2/2021 | Kerner | G01S 7/006 |
| 2022/0116192 A1* | 4/2022 | Noh | H04L 5/0091 |
| 2023/0148403 A1* | 5/2023 | Fang | H04L 25/0202 |
| | | | 370/329 |
| 2023/0388986 A1* | 11/2023 | Yang | H04L 27/26132 |
| 2024/0080832 A1* | 3/2024 | Türkmen | H04W 72/12 |
| 2024/0244601 A1* | 7/2024 | Kim | H04L 5/0007 |
| 2025/0097911 A1* | 3/2025 | Yu | H04W 72/0446 |

OTHER PUBLICATIONS

IEEE, "IEEE P802.11be/D2.3, Draft Standard for Information technology—Telecommunications and information exchange between systems Local and metropolitan area networks—Specific requirements, Part 11: Wireless LAN Medium Access Control (MAC) and Physical Layer (PHY) Specifications." Nov. 2022, relevant pp. 1, 676-677, 689, and 799-800.

\* cited by examiner

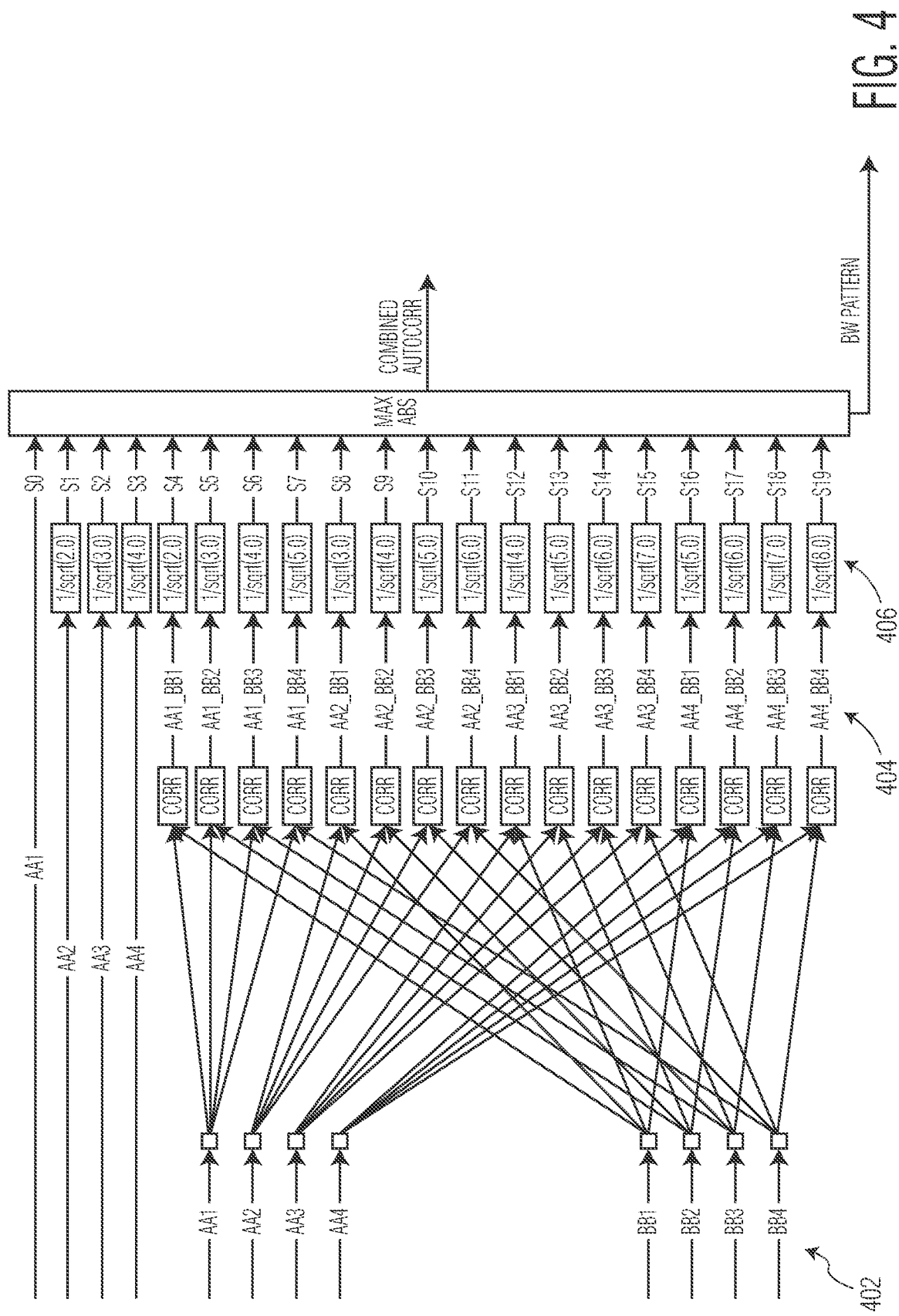

METHOD AND APPARATUS FOR BANDWIDTH DETECTION IN WIRELESS NETWORKS

CROSS-REFERENCE TO RELATED APPLICATIONS

This application claims the priority under 35 U.S.C. § 119 of India Patent application no. 202341035107, filed on 19 May 2023, the contents of which are incorporated by reference herein.

FIELD OF USE

The present disclosure relates generally to wireless networks, and more particularly, to a method and apparatus for bandwidth detection in wireless networks.

BACKGROUND

Bandwidth pattern estimation is a process of characterizing a bandwidth used for communication. Bandwidth pattern estimation is an important enabler of range extension for wireless communication which conforms to the Institute of Electrical and Electronics Engineers (IEEE) 802.11be WiFi standard. Typical bandwidth pattern estimation involves computing the bandwidth pattern estimate late in reception of a packet after receiving a legacy short training field (L-STF) and legacy long training field (L-LTF) and at least a portion of a legacy signal field (L-SIG) of the packet based on power measurements or in a frequency domain and could require storing symbols of the legacy signal field (L-SIG) which is received until the bandwidth pattern is estimated. Based on this estimated bandwidth pattern, the symbols of L-SIG in different sub-bands of the bandwidth are then combined based on log likelihood ratio (LLR) combining to decode the L-SIG. The late bandwidth pattern estimation and need to store the symbols of the L-SIG until the bandwidth pattern is estimated increases resource requirements and latency associated with packet decoding.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

FIG. 4 illustrates an example grouping of a winning bandwidth of the suboptimal grouping in accordance with an embodiment.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Example Systems

Figure 1:
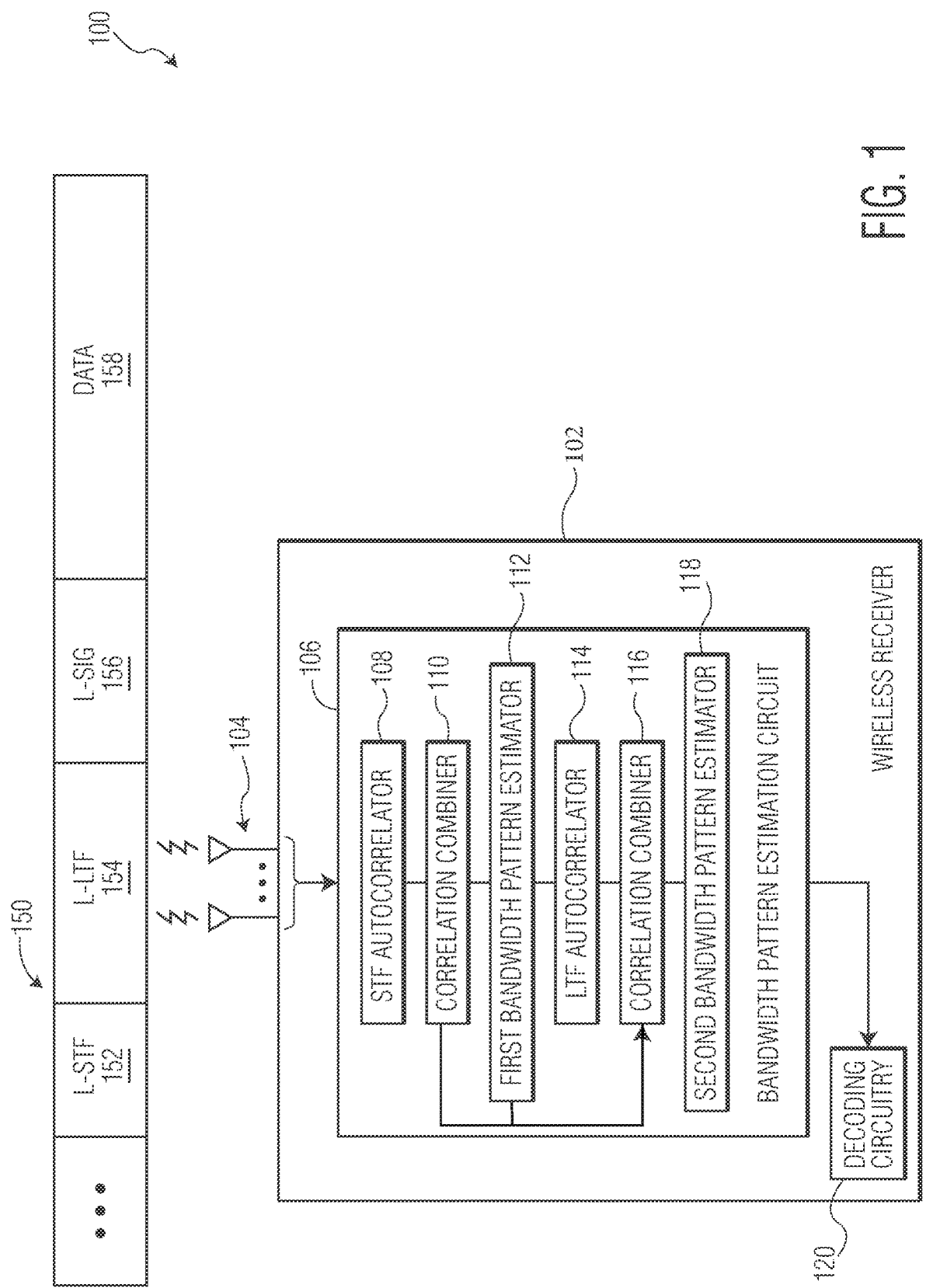
FIG. 1 is an example simplified block diagram of a wireless communication system including a wireless receiver arranged to implement bandwidth pattern estimation in accordance with an embodiment.

FIG. 1 is an example simplified block diagram of a wireless communication system 100 including a wireless receiver 102 arranged to implement bandwidth pattern estimation in accordance with an embodiment. It should be noted that the system 100 shown in FIG. 1 is provided as an example, not as a limitation, and embodiments are applicable to any system where bandwidth pattern estimation is to be performed.

The receiver 102 includes a plurality of receive antennas 104. The plurality of receive antenna 104 may be one or more antenna for receiving a wireless signal 150. The signal 150 may be an orthogonal frequency division multiplexed (OFDM) frame with a plurality of fields defined by the IEEE 802.11 WiFi standard and consist of two parts, a preamble indicated by one or more fields 152-156 and data field 158. The preamble is also called the physical header and it is prepended to the data field. The preamble is further divided into smaller parts. The first part is the legacy preamble consisting of the Legacy Short Training fields (L-STF) 152, the Legacy Long Training fields (L-LTF) 154, and the Legacy Signal field (L-SIG) 156 associated with IEEE 802.11. The Legacy Short Training field 152 consists of a waveform for start of packet detection, automatic gain control (AGC), initial frequency offset estimation, and initial time synchronization, in an example. The Legacy Long Training field 154 is also a waveform, but it is different from the L-STF 152. The receiver uses the waveform of the L-LTF 154 after it has detected the L-STF 152, for channel estimation and more accurate frequency offset estimation and time synchronization, in an example. The L-SIG field 156 includes one or more symbols that define rate, length, and parity information of a wireless communication, in an example. The signal 150 may have a bandwidth which is subdivided into a plurality of sub-bands. In an example, the signal 150 may comprise one or more 20 MHz sub-bands in accordance with IEEE 802.11 and the receiver 102 may have a receiver bandwidth to receive signals in one or more sub-bands.

The receiver 102 may also have a bandwidth pattern estimation circuit 106. Bandwidth pattern estimation is a process of determining over which sub-bands of a receiver bandwidth the signal 150 is transmitted. The receiver bandwidth may include a plurality of sub-bands that span a frequency range greater than a signal bandwidth of the signal 150, and in an example, the fields of the signal 150 may be duplicated in one or more sub-bands of the receiver bandwidth. A transmitter may not transmit the signal 150 over certain sub-bands in the receiver bandwidth due to interference in an example. The bandwidth pattern estimation circuit 106 may provide an early estimate of a bandwidth pattern, e.g., prior to receipt of the L-SIG field, which improves decoding of various modes of the signal 150 such as dual carrier mode (DCM)/duplicate (DUP) mode supported in IEEE 802.11be. The bandwidth pattern may estimate one or more sub-bands where the signal 150 is detected in the receiver bandwidth of the receiver 102. The bandwidth pattern estimation circuit 106 may further include an STF autocorrelator 108 and a correlation combiner 110. The STF autocorrelator 108 may perform an autocorrelation for each sub-band in a receiver bandwidth and when samples of the L-STF 152 is received by an antenna. Samples of the autocorrelation may be represented as phasors with an angle and magnitude over the L-STF. The autocorrelation of angles may be robust to gain changes in the received signal which may occur during receipt of the L-STF 152. The correlation may be performed per sub-band and per antenna in an example. The correlation combiner 110 may combine the autocorrelation determined for each antenna over the plurality of the antenna 104 to form an autocorrelation per sub-band. The combination per sub-band across antennas may be based on an average of the autocorrelation across antenna for a sub-band or based on a signal-to-noise of an antenna in an example. A first bandwidth pattern estimator 112 may then determine a combination (e.g., grouping) of sub-bands in the receiver bandwidth that maximizes an autocorrelation which is a crude bandwidth pattern estimate. The grouping may be optimal or suboptimal in an example in finding a grouping of sub-bands which maximizes an autocorrelation among the sub-bands.

In an example, the bandwidth pattern estimate may be refined. The bandwidth pattern estimation 106 may have an LTF autocorrelator 114 to perform an autocorrelation of angles for each sub-band in the receiver bandwidth and when samples of the L-LTF 154 is received by an antenna. A correlation combiner 116 may receive the autocorrelation associated with the L-STF 152, L-LTF 154 and the crude bandwidth pattern estimate and combine based on the crude bandwidth pattern estimate the autocorrelation associated with the L-STF 152, L-LTF 154 to determine a combined autocorrelation per sub-band for the antennas. A second bandwidth pattern estimator 118 may receive this combined autocorrelation per sub-band to then refine the bandwidth pattern estimation by performing another grouping of sub-bands in the receiver bandwidth. The refined bandwidth pattern estimate may then be provided to decoding circuity 120 which uses the refined bandwidth pattern estimate to combine information across sub-bands of the refined bandwidth during the decoding of symbols of one or more signal fields of the OFDM signal 150 and one or more of the data fields of the OFDM signal 150 such as based on a log likelihood ratio (LLR) combining. For example, the refined bandwidth estimate may be used to decode symbols of the L-SIG field of the one or more signal fields. As another example, for 802.11n, the refined bandwidth estimate may be used to decode symbols of signal fields HT-SIG1 and HT-SIG2, in addition to or instead of the L-SIG field. As yet another example, for 802.11ac, the bandwidth pattern estimate may be used to decode symbols of signal fields VHT-SIGA1 and VHT-SIGA2, in addition to or instead of the L-SIG field.

Figure 2:
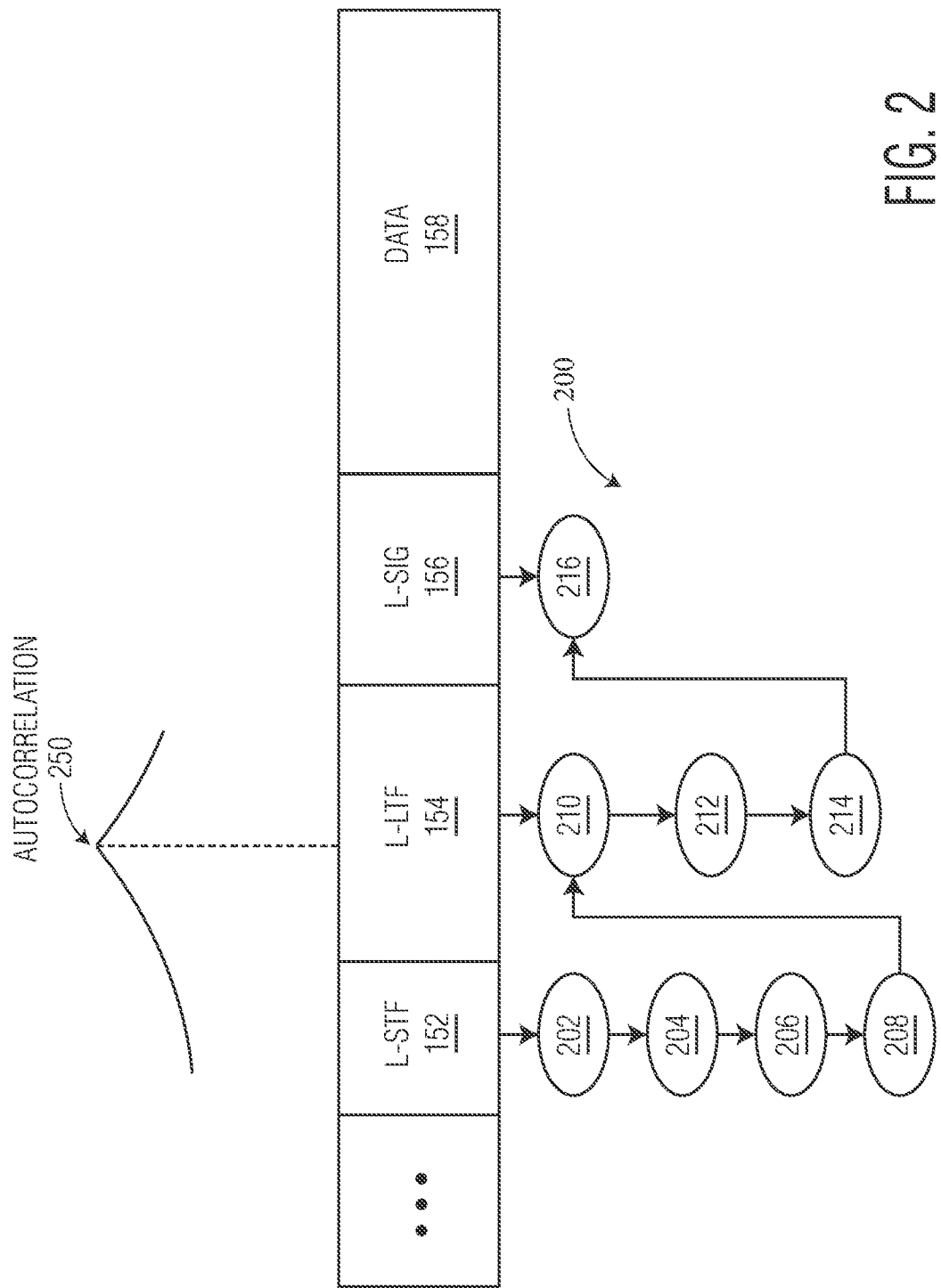
FIG. 2 is an example sequence diagram that illustrates bandwidth pattern estimation in accordance with an embodiment.

FIG. 2 is an example sequence diagram 200 that illustrates bandwidth pattern estimation in accordance with an embodiment. The sequence diagram 200 shows operations of the bandwidth pattern estimation that is performed as the legacy-short training field (L-STF) 152, the legacy long-training field (L-LTF) 154, and legacy signal field (L-SIG) 156 of the wireless signal 150 received by the receiver 102.

The receiver 102 may have a receiver bandwidth to receive a plurality of 20 MHz sub-bands. The receiver bandwidth may be subdivided into one or more sub-bands. The receiver 102 may receive a signal which includes signal 150 in a receiver bandwidth and filter the signal in each sub-band of the receiver bandwidth such as filtering on 20 MHz sub-bands.

The signals received may be modulated on an in-phase (I) component and a quadrature phase (Q) component. At 202, I/Q samples of the signals received by each antenna and each sub band in the receiver bandwidth may be converted into phasors:

$$p_k^{a,b} = e^{j \angle x_k^{a,b}}$$

where $x_k^{a,b}$ is the $k^{th}$ I/Q sample corresponding to antenna a and band b in the receiver bandwidth. The phasors may be received on a periodic basis and over a period of the legacy short training field (L-STF) 152 of the signal 150. The periodicity of symbols in the L-STF 152 may be 0.8 us defined by IEEE 802.11 and the duration of the L-STF may be 8 us.

At 204, an autocorrelation may be performed by the STF autocorrelator 108 on the phasors for each sub-band as:

$$r_n^{a,b} = \sum_{k=n-\gamma F_s+1}^{n} \left(p_{k-\tau F_s}^{a,b}\right)^* p_k^{a,b}$$

where $\gamma$=7.2 µs, $\tau$=0.8 µs, $F_S$ is the sampling frequency

The sampling frequency may be a rate at which the receiver 102 samples the signal. The receiver 102 may be free to choose this parameter as long as this is greater than or equal to the bandwidth of the signal. In an example, the autocorrelation may have a duration of 8 us which includes a duration of the L-STF 152 such that the autocorrelation is performed over a period of 7.2 us for the received phasors. This autocorrelation may be referred to as an STF correlation.

In an example, a carrier sensing (i.e. WiFi packet detection) may be performed based on the STF autocorrelation. Carrier sensing is based on level check on the autocorrelations, i.e., the magnitude of the autocorrelation samples need to exceed a pre-defined threshold and stay above that threshold for a pre-defined number of samples, for carrier sense/packet-detection to be asserted. An example of the autocorrelation is shown as autocorrelation 250. Carrier sensing is done by comparing the correlation values against a pre-defined threshold. If the magnitude of correlations exceeds this pre-defined threshold value and stays above this threshold for some pre-defined duration, carrier sense is asserted (i.e. a packet is detected).

In some examples, the received signal may include a spurious signal which is not the L-STF 152. The spurious signal such as a single tone signal, continuous wave signal, or chirp may be detected by performing an autocorrelation with a periodicity other than 0.8 us. Additionally, or alternatively, a power of signals may be compared in each sub-band to detect presence of non-WiFi signals or overlapping basic service set (OBSS) signals which are also spurious signals. If a spurious signal is detected, then the autocorrelations associated with a sub-band are not qualified and not used in the bandwidth pattern estimation.

At 206, the autocorrelations $r_n^{a,b}$ corresponding to a sub-band b for each antenna a may be combined across antennas, e.g., by an averaging process, and the antenna-combined autocorrelation values $r_n^b$ may be obtained. This process may be repeated for each sub-band.

At 208, the bandwidth of the sub-bands may be combined on a per-sample basis based on the autocorrelations determined for each sub-band. The combining may include forming various groups i of sub-bands 1 . . . B in the receiver bandwidth but not including in any of the groups sub-bands which are not qualified. For each group of sub-bands ($b_{i_1}$, $b_{i_2}$, . . . , $b_{i_B}$). the sub-band correlations associated with the sub-bands in the group may define a combined autocorrelation $c_n$ which are combined and given as:

$$c_n^{(b_{i_1},b_{i_2},\ldots,b_{i_B})} = \frac{1}{\sqrt{B}}\sum_{j=1}^{B} r_n^{b_{i_j}}$$

Bandwidth pattern estimation is done by forming various groups of sub-bands in the receiver bandwidth and combining autocorrelations across these sub-bands. A group that maximizes the magnitude of the combined autocorrelation may be called a winning group. The sub-bands in the winning group are declared to be occupied (e.g., the signal 150 is transmitted in the sub-band) and the other sub-bands are declared to be unoccupied and the occupied one or more bands defines the bandwidth pattern estimation. In an example, the group may be represented as a bandwidth pattern estimate which is a sequence of N bits where N is a number of 20 MHz sub-bands within a receiver bandwidth. A bit is assigned one if a corresponding sub-band is present in the maximizing group and zero otherwise to form a string of bits representative of the bandwidth pattern estimate. The bandwidth pattern estimate may change for each sample and be used for subsequent carrier sensing and symbol timing estimation.

If a combined autocorrelation magnitude crosses a predefined threshold (called early bandwidth pattern estimation threshold, denoted $\Gamma_{early}$), the bandwidth pattern estimate is recorded and output as an early bandwidth pattern estimate. In an example, combined autocorrelation magnitudes corresponding to multiple combinations could exceed the $\Gamma_{early}$ threshold, but the early bandwidth pattern estimate is the combination that maximizes the combined autocorrelation magnitude.

If the combined autocorrelation magnitude does not cross the early bandwidth pattern estimation threshold (i.e. $\Gamma_{early}$), then the bandwidth pattern estimate is determined based on a peak of the combined autocorrelation (i.e. the bandwidth pattern estimate recorded when the combined correlation reaches its peak value). Whenever a new peak of combined autocorrelation is found, the new bandwidth pattern estimate is recorded. This bandwidth pattern estimate is referred to as an L-STF peak pattern estimate or a crude bandwidth pattern estimate and is stored along with the per-band autocorrelation values ($r_{LSTF}^b$).

At 210, the L-LTF 154 may be detected in the signal 150 based on the autocorrelations. The timing of the L-LTF 154 may be indicated at the instant where the autocorrelation reaches its peak and starts falling and indicates the time at which the L-LTF 154 begins and a start-boundary of the L-LTF 154. The L-LTF 154 may have two symbols with a periodicity of 3.2 μs and length of 3.2 μs.

At 212, an angle-based autocorrelation with a periodicity of 3.2 μs and length of 3.2 μs may be performed for each sub-band in the receiver bandwidth and when samples of the L-LTF is received. The autocorrelation may then be combined across each antenna and represented as $r_{LLTF}^b$. This autocorrelation output may be used to refine the bandwidth pattern estimate. In an example, a correlation refinement may include combining angle-based autocorrelation during the L-LTF 154 with the stored angle-based autocorrelation samples during the L-STF 152 based on the crude bandwidth pattern estimate.

In an example, coarse and fine carrier frequency offset (CFO) estimates may be used to correct autocorrelation outputs during the L-STF 152 and L-LTF 154 in each sub-band of an antenna. Coarse CFO is estimated based on L-STF 154. In order to estimate coarse CFO, a phase build-up across one period of L-STF 152 is determined. This is further reflected in the phase of the autocorrelations that are performed during the L-STF 154. The estimated coarse CFO is obtained by dividing the phase build-up during the L-STF 152 based correlations over the period by (2*pi* (0.8e−6) where (0.8e−6) is the periodicity of symbols of the L-STF 152. To make this estimation reliable, the correlation output sample in a sub-band that has the largest magnitude (implying good signal to noise ratio) is selected for the coarse CFO.

In an example, angle-based autocorrelation is performed (per-antenna, per-sub-band) when the samples of the L-LTF 152 with periodicity of 3.2 μs is received and in an accumulation window of 3.2 μs, i.e. $l^{a,b}=\Sigma_{k=t-\gamma F_s+1}^{t}(p_{k-\tau F_s}^{a,b})$ $*p_k^{a,b}$ where t is the last sample of L-LTF, γ=3.2 μs, τ=3.2 μs, $F_S$ is the sampling frequency. $p_k^{a,b}=\exp(j<x_k^{a,b})$, where $x_k^{a,b}$ is the $k^{th}$ sample when the L-LTF 154 is received and corresponding to antenna index a and sub-band index b. The fine CFO may be computed based on the samples of the L-LTF 154 which is in the occupied sub-bands indicated by the crude bandwidth pattern estimate. Conventional methods use the samples across the entire receiver bandwidth when the L-LTF 154 is received (since bandwidth of the signal is not indicated beforehand) to determine the fine CFO. In an example, a bandwidth pattern of the signal 150 is estimated before the L-LTF 154 is received. Using this bandwidth pattern estimate, those sub-bands of L-LTF 154 that are indicated by the crude bandwidth pattern as occupied and not the other sub-bands that may contain purely noise may be used to obtain a more reliable estimate of the fine CFO, since sub-bands that contain signal are used and not those that contain only noise and no signal). In order to estimate fine CFO, the phase build-up across one period of L-LTF 154 is determined. This is further reflected in the phase of the autocorrelations that are performed on the L-LTF 154. The estimated fine CFO is obtained by dividing the phase buildup of the L-LTF 154 based correlations over a period by (2*pi* (3.2e−6)). Notice that (3.2e−6) is the periodicity of symbols of the L-LTF 154.

In an example, the coarse and fine CFO estimate may be used to correct both the stored L-STF based autocorrelation samples and the L-LTF based autocorrelation outputs $l^{a,b}$ where the coarse and fine CFO corrected autocorrelation samples is denoted as $\gamma_{LSTF}^{a,b}$ and $\gamma_{LLTF}^{a,b}$ respectively.

Consider true CFO is $f_{true}$. Estimated coarse CFO is $f_{coarse}$ and estimated fine CFO is $f_{fine}$. So, the total CFO estimate is $\hat{f}=f_{coarse}+f_{fine}$. Since L-STF correlations have a periodicity of 0.8 us, the correlations will have a phase build-up of $(2\pi f_{true} \times 0.8e-6)$. On the other hand, since L-LTF based correlations have a periodicity of 3.2 μs, the L-LTF based correlations will have a phase build-up of $(2\pi f_{true} \times 3.2e-6)$. During the L-STF and L-LTF, different amounts of phase may build-up owing to different periodicities of correlations and the L-STF and L-LTF based correlations cannot be directly combined. In order to combine these correlations, the correlations may be phase-compensated. L-STF based correlations are phase compensated by multiplying these with $\exp(-j2\pi\hat{f}\times 0.8e-6)$, while L-LTF based correlations are phase compensated by using a multiplication factor of $\exp(-j2\pi\hat{f}\times 3.2e-6)$. After this phase compensation step, the L-STF based correlations may be aligned with the L-LTF based correlations and these can now be combined. The L-STF and L-LTF compensated autocorrelations may be denoted as $\gamma_{LSTF}^{a,b}$ and $\gamma_{LLTF}^{a,b}$ respectively.

In an example, an accumulation window of $\gamma_{LSTF}^{a,b}$ is 7.2 μs while that of $\gamma_{LLTF}^{a,b}$ is only 3.2 μs. Hence noise variance in $\gamma_{LSTF}^{a,b}$ is 7.2/3.2=2.25 times the noise variance in $\gamma_{LLTF}^{a,b}$. Thus optimal combination of L-STF and L-LTF based autocorrelations is $$\frac{\gamma_{LSTF}^{a,b}}{\sqrt{2.25}} + \gamma_{LLTF}^{a,b} = \frac{\gamma_{LSTF}^{a,b}}{1.5} + \gamma_{LLTF}^{a,b}.$$

Based on the scaling, the optimal combination is $\gamma_{LSTF}^{a,b}+1.5\gamma_{LLTF}^{a,b}$ and this combination is called the refined autocorrelation and denoted as $r_{refined}^{a,b}$.

At 214, the CFO corrected L-STF-based and L-LTF-based autocorrelation outputs may be computed as $r_{refined}^{a,b}=\gamma_{LSTF}^{a,b}+1.5\times\gamma_{LLTF}^{a,b}$. The refined autocorrelation outputs in all sub-bands may be used to re-compute the bandwidth pattern estimate in a manner as described above. The re-computed bandwidth pattern estimate is called the refined bandwidth pattern estimate and indicates a group of sub-bands.

At 216, the refined bandwidth estimate may be used to combine data such as symbols of the preamble and data portions of the packet across the group of sub-bands. The refined bandwidth estimate may be used while decoding non-HT (high throughput) duplicate/quadrature/octuplicate packets of IEEE 802.11, where same data is replicated in multiple 20 MHz sub-bands. Because bandwidth is not indicated in the L-SIG field 156 for these packets, the refined bandwidth estimate is needed to decode the packets. Note that when such packets are received at good SNR, it is sufficient to decode only the primary 20 MHz sub-band (since the entire information is available in the primary 20 MHz sub-band itself), but at very low SNR levels, the signal from multiple 20 MHz sub-bands is used, since combining the signal across multiple sub-bands can improve the signal to noise ratio. However this is only possible when there is an estimate for the occupied bandwidth which is the refined bandwidth estimate. The disclosed bandwidth pattern estimate allows for receiving a packet with lower packet error rate and packet detection error for a particular receive power compared to conventional bandwidth pattern estimation methods.

In an example, the bandwidth pattern estimation may be used to also estimate a signal-to-noise ratio for each antenna of a plurality of antenna. A signal power for each antenna and for each sub-band may be computed. For each antenna, power across occupied sub-bands according to the bandwidth pattern estimation (crude/refined) may be combined which is denoted as the band-combined power value for antenna j as $P_j$ which gives the SNR estimate for antenna j. In an example, an input-referred power is determined by measuring power in a baseband and offsetting the measured power by gain control gains and an estimated noise-figure of the gain stages to determine an SNR for an antenna. For example, the per-antenna SNR estimation may be determined by computing a running power from per-antenna per-band samples, i.e. $P_n^{a,b}=(1-\alpha)P_{n-1}^{a,b}+\alpha|x_n^{a,b}|^2$ for a sample n. An automatic gain control (AGC) gain may be subtracted from the running power to determine the input referred power (which is an estimate of SNR) which is denoted as $S_n^{a,b}$. Based on the bandwidth pattern estimation, the SNR estimation across the occupied sub-bands as indicated by the bandwidth pattern may be combined to get $S_n^a$, which provides an estimate of per-antenna SNR. An optimal scaling for autocorrelation of two paths having SNR1 and SNR2 respectively is given as $\sqrt{SNR1}$ and $\sqrt{SNR2}$ respectively. Alternatively, we can perform a relative scaling of the autocorrelation of the paths by leaving the first path unchanged and only scaling the other path by $$\sqrt{\frac{SNR2}{SNR1}}.$$

The scaling may be used to adjust the autocorrelation in the bandwidth pattern estimation process. In an example, when gain control happens independently across antennas, one may combine the outputs according to SNR estimates of the antennas in the bandwidth pattern estimation process. In an example, the SNR estimates may be used to disable autocorrelation at one or several antennas if the SNR estimates corresponding to these antennas are much less as compared to the other antennas in the bandwidth pattern estimation process.

An optimal grouping associated with bandwidth pattern estimation during the crude and refined bandwidth pattern estimation may be determined by considering all possible groups of combinations of sub-bands in the receiver bandwidth: Groups of size-1: $(b_1), (b_2), \ldots (b_N)$; Groups of size-2: $(b_1, b_2), (b_1, b_3), \ldots, (b_i, b_j), \ldots, (b_{N-1}, b_N), \ldots$ so on, Group of size-N: $(b_1, b_2, \ldots, b_N)$ where b is a sub-band. A winning group is the one that maximizes the magnitude of the combined autocorrelation across all groups of all sizes. While this give the best performance for small N, this is typically not feasible for large N since the number of groups grow exponentially with N and a suboptimal grouping is more feasible.

Figure 3:
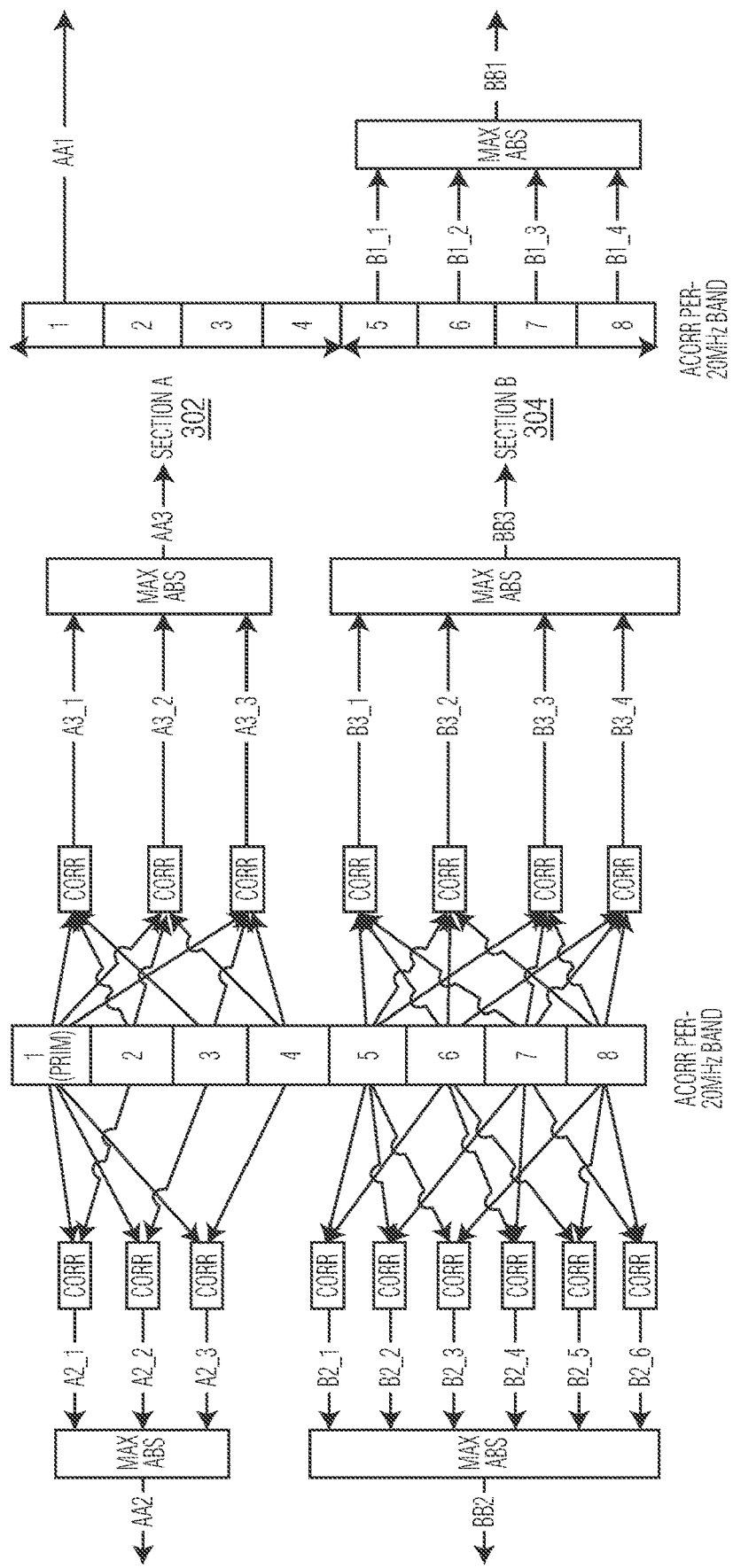
FIG. 3 illustrates an example sub-optimal grouping of sub-bands of the receiver bandwidth in accordance with an embodiment.

FIG. 3 illustrates an example sub-optimal grouping of sub-bands of the receiver bandwidth in accordance with an embodiment. N sub-bands of the receiver bandwidth are divided into sections of sub-bands and optimal grouping is performed within each section. This is possible since a length of each section is relatively small. Winning groups are found for each group size within each section. In an example, all groups within the section that contains the primary sub-band, must contain the primary sub-band. The primary sub-band may be known during an association process with the Access Point (AP). Combinations across sections are limited to the winning groups. An example implementation with N=8 is shown where sub-bands 1,2,3,4 form a section A 302 and sub-bands 5,6,7,8 form a section B 304. Sub-band 1 is the primary sub-band. In an example, the following groups are formed within section A: group of size-1: $(b_1)$ which contain the primary sub-band; groups of size-2: $(b_1, b_2), (b_1, b_3), (b_1, b_4)$; groups of size-3: $(b_1, b_2, b_3), (b_1, b_2, b_4), (b_1, b_3, b_4)$; group of size-4 (not shown): $(b_1, b_2, b_3, b_4)$. Following groups are formed in section B: groups of size-1: $(b_5), (b_6), (b_7), (b_8)$; groups of size-2: $(b_5, b_6), (b_5,$ $b_7$), ($b_5$, $b_8$), ($b_6$, $b_7$), ($b_6$, $b_8$), ($b_7$, $b_8$); groups of size-3: ($b_5$, $b_6$, $b_7$), ($b_5$, $b_6$, $b_8$), ($b_5$, $b_7$, $b_8$), ($b_6$, $b_7$, $b_8$); group of size-4 (not shown): ($b_5$, $b_6$, $b_7$, $b_8$).

For each section, for each group size, winning groups are found. In the above example, AA2 is the winning group among size-2 groups in section A. BB2 is the winning group among size-2 groups in section B. AA3 is the winning group among size-3 groups in section A, BB3 is the winning group among size-3 groups in section B, BB1 is the winning group among size-1 groups in section B. AA1 is the size-1 group formed by the primary sub-band (primary always wins) in section A.

FIG. 4 illustrates an example grouping of a winning bandwidth of the suboptimal grouping in accordance with an embodiment. In an example, winning groups 402 (i.e. AA1, AA2, AA3, BB1, BB2, BB3) may participate in forming larger groups 404 that involve both section A and section B. A scaling factor 406 may be applied based on a total number of sub-bands involved in a group, e.g., consider the group AA1_BB3 which is formed by combining the winning size-1 group from section A and the winning size-3 group from section B. A total number of sub-bands participating in this group is 1+3=4, and hence a scaling factor is $$\frac{1}{\sqrt{4}}.$$

In an example, disqualified sub-bands may not participate in the selection process. Correlation outputs corresponding to disqualified bands may be driven to 0, so that they are rejected in subsequent selection stages.

In an example, complexity in determining the bandwidth pattern estimation may be reduced by performing the bandwidth pattern estimation based on groups of size 2 sub-bands and a thresholding process. Each size-2 group has the primary sub-band as one of its members. e.g., one such group can be represented as ($b_1$, $b_j$). $j \neq 1$. The combined autocorrelation magnitude for this group is $$\left| c_n^{(b_1,b_j)} \right| = \frac{1}{\sqrt{2}} \left| r_n^{b_1} + r_n^{b_j} \right|.$$

This is compared against the autocorrelation magnitude of the primary sub-band, i.e. $|r_n^{b_1}|$ and if $|c_n^{(b_1,b_j)}| > \tau |r_n^{b_1}|$ holds (where $\tau$ is a threshold), then the sub-band $b_j$ is considered occupied, else unoccupied. This test is performed for all non-primary sub-bands and each nonprimary sub-band is determined to be either occupied or unoccupied. The occupied bandwidths may be combined to define the bandwidth pattern estimation.

In an example, the bandwidth pattern estimation may be based on a magnitude of autocorrelation from each non-primary sub-band. The magnitude may be compared against the magnitude of autocorrelation of the primary sub-band, i.e. $|r_n^{b_j}| > \tau |r_n^{b_1}|$ (where $\tau$ is a threshold). The sub-band $b_j$ is declared to be occupied if this test passes else it is declared to be unoccupied. The occupied bandwidths may be combined to define the estimated bandwidth.

As described above, autocorrelations from different antennas may be combined by averaging autocorrelations across antennas for each sub-band b. When number of antennas is small, groups of antennas may be formed and combined autocorrelations across antennas using a scaling factor is determined based on the number of antennas in the group. In an example implementation with two antennas, an autocorrelation which has the largest magnitude among the following three options below may be chosen for an auto-correction across different antenna in an alternative to averaging of the autocorrelations in an example:

1) $r_n^{1,b}$

2) $r_n^{2,b}$

3) $\frac{1}{\sqrt{2}} \left( r_n^{1,b} + r_n^{2,b} \right)$

Other variations are also possible.

Example Methods

Figure 5A:
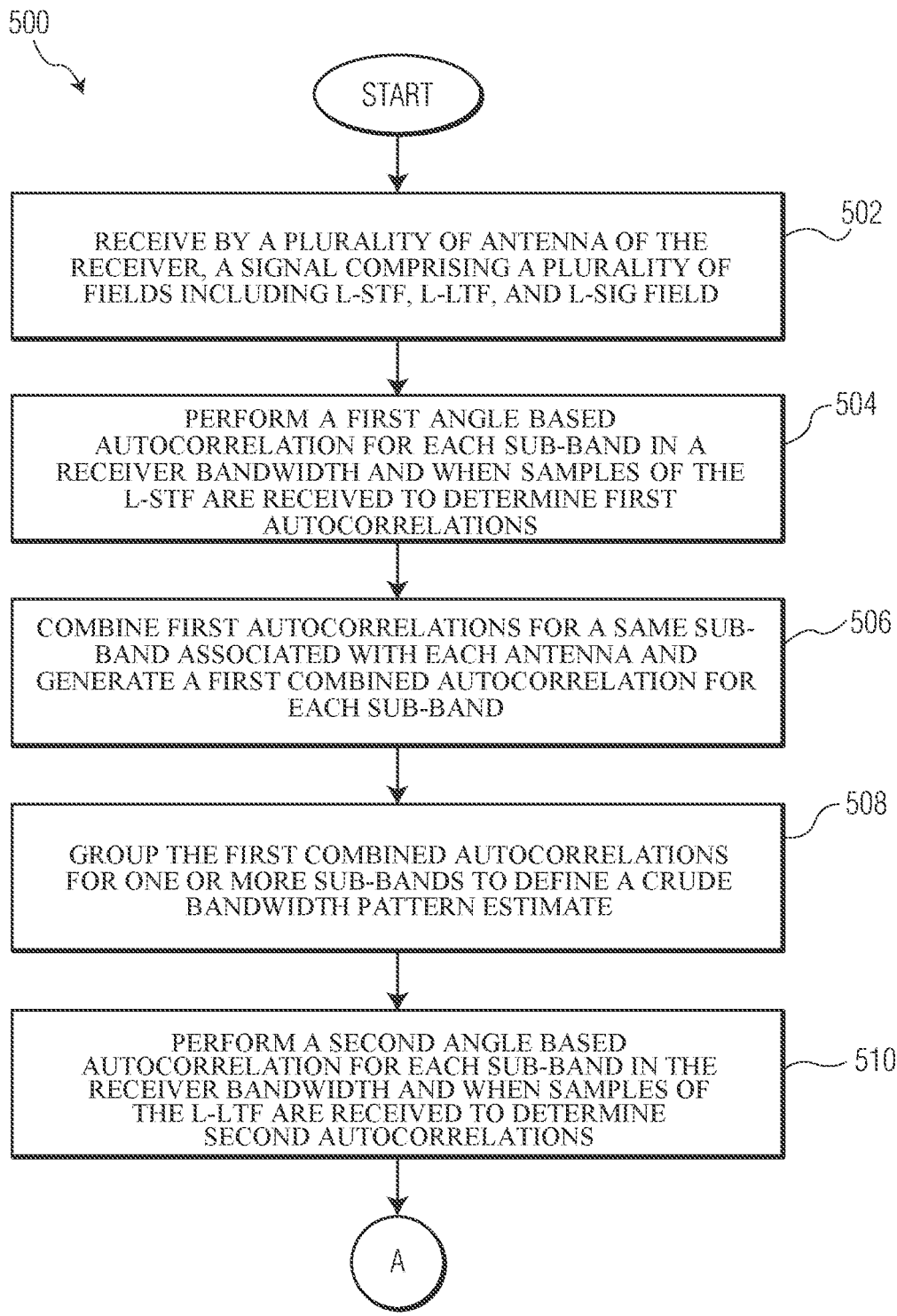
FIGS. 5A, 5B is an example flowchart that illustrates a bandwidth pattern estimation method in accordance with an embodiment.
Figure 5B:
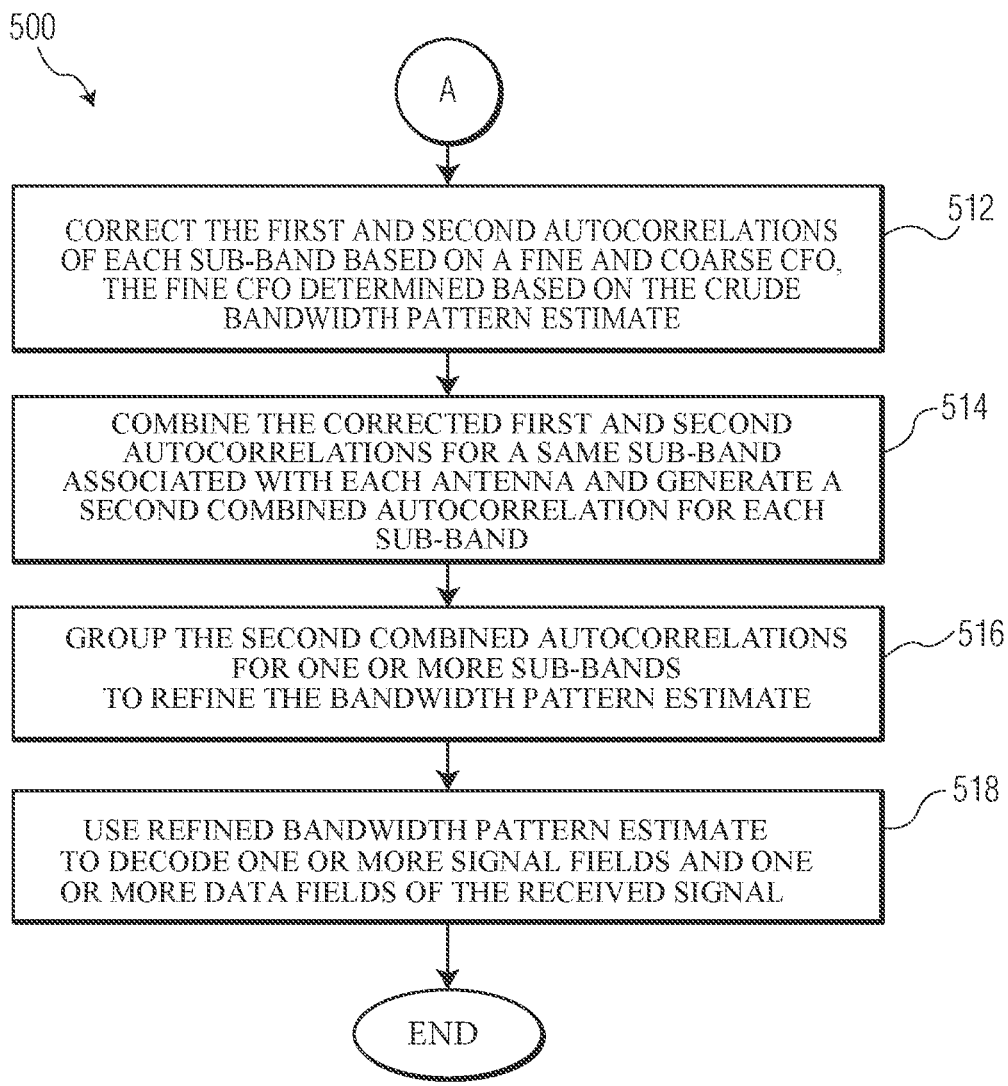

FIGS. 5A, 5B is an example flowchart 500 that illustrates a bandwidth pattern estimation method in accordance with an embodiment. The bandwidth pattern estimation method may be performed over a plurality of sub-bands based on the wireless receiver 102 receiving a signal 150 having an L-STF field 152, L-LTF field 154, and L-SIG field 156 in an example.

At 502, the plurality of antenna of the receiver 102 receives a signal comprising a plurality of fields including a L-STF, L-LTF, and L-SIG field. The signal may be transmitted in one or more sub-bands of a receiver bandwidth and in an example, the sub-bands may be one or more 20 MHz sub-bands. At 504, a first angle based autocorrelation is performed for each sub-band in a receiver bandwidth and when samples of the L-STF are received to determine first autocorrelations. The samples may be phasors of the samples so that the autocorrelation is less affected by gain variations. At 506, the first autocorrelations for a same sub-band associated with each antenna are combined and a first combined autocorrelation for each sub-band is generated. The first combined autocorrelation for each sub-band may be then used to determine over which sub-bands in the receiver bandwidth the fields of the signal are transmitted. At 508, a plurality of groups of sub-bands are formed and a group is determined which maximizes a magnitude based on the first combined autocorrelations for one or more sub-bands. In an example, the combination may include determining a group of sub-bands which maximizes a magnitude based on the first combined autocorrelations for one or more sub-bands in the group. This group defines a crude bandwidth pattern estimate which identifies the sub-bands over which the fields of the signal are transmitted. At 510, a second angle based autocorrelation is performed for each sub-band in the receiver bandwidth and when samples of the L-LTF are received to determine second autocorrelations. At 512, the first and second autocorrelations of each sub-band are corrected based on a fine and coarse CFO, the fine CFO determined based on the crude bandwidth pattern estimate. At 514, the corrected first and second autocorrelations are combined for a same sub-band associated with each antenna and a second combined autocorrelation for each sub-band is generated. At 516, the second combined autocorrelations for one or more sub-bands are grouped to refine the bandwidth pattern estimate. In an example, the combination may include determining a group of sub-bands in the receiver bandwidth which maximizes a magnitude based on the second combined autocorrelations for one or more sub-bands to form the refined bandwidth pattern estimate. At 518, the refined bandwidth pattern estimate is used to decode one or more signal fields and one or more data fields of the received signal based on the refined bandwidth pattern estimate. The one or more signal fields may comprise the L-SIG which is also decoded in an example.

Example Apparatus

Figure 6:
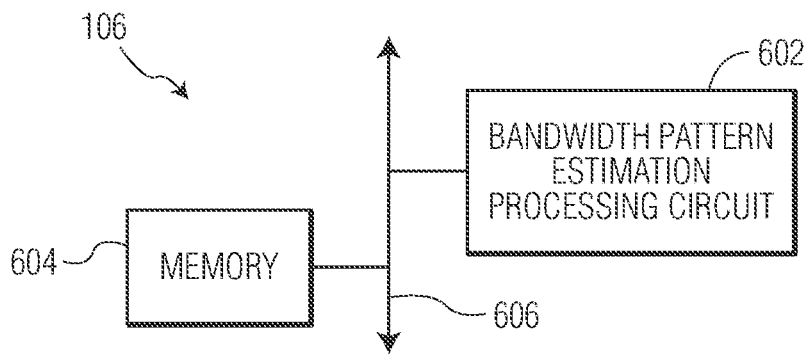
FIG. 6 is an example arrangement of a bandwidth pattern estimation circuit which performs the bandwidth pattern estimation in accordance with an embodiment.

FIG. 6 is an example arrangement of the bandwidth pattern estimation circuit 106 which performs the bandwidth pattern estimation in accordance with an embodiment. The circuit 106 comprises a bandwidth pattern estimation processing circuit 602 (possibly including logic circuitry, hardware, multiple processors, multiple cores, multiple nodes, and/or implementing multi-threading, etc.) and memory 604 such as system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more other possible realizations of non-transitory machine-readable media/medium. In some examples, the bandwidth pattern estimation processing circuit 602 may perform the bandwidth pattern estimation as described herein and the memory 604 may store computer code, program instructions, computer instructions, program code which is executable by the bandwidth pattern estimation processing circuit 602 to perform the bandwidth pattern estimation. Interconnect 606 such as a bus (e.g., PCI, ISA, PCI-Express) may couple the processor 602 and the memory 604. The bandwidth pattern estimation as disclosed allows for early bandwidth detection with angle-based autocorrelations to improve decoding performance of OFDM frames.

In an embodiment, a method is disclosed. The method comprises receiving, by a wireless receiver, a wireless signal comprising a plurality of fields including a legacy short training field (L-STF), legacy long training field (L-LTF), and legacy signal (L-SIG) field transmitted to a plurality of antenna of the wireless receiver; for each sub-band in a receiver bandwidth and when samples of the L-STF is received, performing a first angle based autocorrelation to determine first autocorrelations; forming a plurality of groups of sub-bands to determine a group which maximizes a magnitude based on the first autocorrelations for one or more sub-bands, the group defining a crude bandwidth pattern estimate which identifies sub-bands over which the fields of the signal are transmitted; for each sub-band in the receiver bandwidth and when samples of the L-LTF is received, performing a second angle based autocorrelation to determine second autocorrelations; correcting the first and second autocorrelation of each sub-band using one or more of a coarse and fine carrier frequency offset (CFO) associated with the L-STF and L-LTF respectively, the fine frequency offset determined based on the crude bandwidth pattern estimate; refining the crude bandwidth pattern estimate based on the corrected first and second autocorrelation of each sub-band by determining a group of sub-bands which maximizes a magnitude based on the corrected first and second autocorrelations for one or more sub-bands to form a refined bandwidth pattern estimate; and decoding one or more signal fields and one or more data fields of the received signal based on the refined bandwidth pattern estimate, wherein the one or more signal fields comprise the L-SIG. In an example, performing the first angle-based autocorrelation and second angle-based autocorrelation is based on phasors of samples of the wireless signal. In an example, performing the first angle based autocorrelation and second angle based autocorrelation comprises performing autocorrelation over a duration of the L-STF and L-LTF respectively. In an example, the method further comprises disqualifying sub-bands which include signals other than signals of interest in the received signal. In an example, determining the group which maximizes the magnitude based on the first autocorrelation for one or more sub-bands comprises identifying that the group optimally maximizes the magnitude. In an example, the refined bandwidth pattern is a sequence of bits where a first value of a bit indicates that a sub-band is in the maximizing group and a second value of the bit indicates that a sub-band is not in the maximizing group. In an example, determining the group which maximizes the magnitude based on the first autocorrelations for one or more sub-bands comprises identifying that the group sub-optimally maximizes the magnitude. In an example, refining the crude bandwidth pattern estimate comprises summing the corrected first and second autocorrelations for a same sub-band. In an example, the method further comprises determining a signal-to-noise ratio for an antenna based on the crude bandwidth pattern estimate or refined bandwidth pattern estimate. In an example, performing the first angle based autocorrelation comprise for each antenna performing the first angle based autocorrelation, the method further comprising combining the first autocorrelation for the same sub-band and associated with each antenna based on the signal-to-noise ratio of the antenna to determine a first autocorrelation per sub-band for the plurality of antenna.

In another embodiment, a bandwidth pattern estimation circuit is disclosed. The bandwidth pattern estimation circuit comprises: a receiver interface arranged to receive a wireless signal comprising a plurality of fields including a legacy short training field (L-STF), legacy long training field (L-LTF), and legacy signal (L-SIG) field transmitted to a plurality of antenna of a wireless receiver; an STF autocorrelator arranged to perform for each sub-band in a receiver bandwidth and when samples of the L-STF is received a first angle based autocorrelation to determine first autocorrelations; a first bandwidth pattern estimator arranged to form a plurality of groups of sub-bands to determine a group which maximizes a magnitude based on the first autocorrelations for one or more sub-bands, the group defining a crude bandwidth pattern estimate which identifies sub-bands over which the fields of the signal are transmitted; an LTF autocorrelator arranged to perform for each sub-band in the receiver bandwidth and when samples of the L-LTF is received a second angle based autocorrelation to determine second autocorrelations and correct the first and second autocorrelation of each sub-band using one or more of a coarse and fine carrier frequency offset (CFO) associated with the L-STF and L-LTF respectively, the fine frequency offset determined based on the crude bandwidth pattern estimate; a second bandwidth pattern estimator arranged to refine the crude bandwidth pattern estimate based on the corrected first and second autocorrelation of each sub-band by determining a group of sub-bands which maximizes a magnitude based on the corrected first and second autocorrelations for one or more sub-bands to form a refined bandwidth pattern estimate; and a decoder arranged to decode one or more signal fields and one or more data fields of the received signal based on the refined bandwidth pattern estimate, wherein the one or more signal fields comprise the L-SIG. In an example, the STF and LTF autocorrelator arranged to perform the first autocorrelation and second autocorrelation is based on phasors of samples of the wireless signal. In an example, the STF autocorrelator and LTF autocorrelator arranged to perform the first angle based autocorrelation and second angle based autocorrelation comprises performing the autocorrelation over a duration of the L-STF and L-LTF respectively. In an example, the first bandwidth pattern estimator is arranged to disqualify sub-bands which include signals other than signals of interest in the received signal. In an example, determining the group which maximizes the magnitude based on the first autocorrelation for one or more sub-bands comprises identifying that the group optimally maximizes the magnitude. In an example, the refined bandwidth pattern is a sequence of bits where a first value of a bit indicates that a sub-band is in the maximizing group and a second value of the bit indicates that a sub-band is not in the maximizing group. In an example, the first bandwidth pattern estimator arranged to determine the group which maximizes the magnitude based on the first autocorrelation for one or more sub-bands comprises the first bandwidth pattern estimator arranged to identify that the group sub-optimally maximizes the magnitude. In an example, the second bandwidth pattern estimator arranged to refine the crude bandwidth pattern estimate comprises the second bandwidth pattern estimator arranged to sum the corrected first and second angle based autocorrelation for a same sub-band. In an example, the first bandwidth pattern estimator is arranged to determine a signal-to-noise ratio for an antenna based on the crude bandwidth pattern estimate or refined bandwidth pattern estimate. In an example, the STF correlator arranged to perform the first angle based autocorrelation is further arranged to perform for each antenna the first angle based autocorrelation and the second bandwidth pattern estimator is further arranged to combine the first autocorrelation for the same sub-band and associated with each antenna based on the signal-to-noise ratio of the antenna to determine a first autocorrelation per sub-band for the plurality of antenna.

A few implementations have been described in detail above, and various modifications are possible. The disclosed subject matter, including the functional operations described in this specification, can be implemented in electronic circuit, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. Other implementations fall within the scope of the following claims.

We claim:

1. A method comprising:
receiving, by a wireless receiver, a wireless signal comprising a plurality of fields including a legacy short training field (L-STF), legacy long training field (L-LTF), and legacy signal (L-SIG) field transmitted to a plurality of antenna of the wireless receiver;
for each sub-band in a receiver bandwidth and when samples of the L-STF is received, performing a first angle based autocorrelation to determine first autocorrelations;
forming a plurality of groups of sub-bands to determine a group which maximizes a magnitude based on the first autocorrelations for one or more sub-bands, the group defining a crude bandwidth pattern estimate which identifies sub-bands over which the fields of the signal are transmitted;
for each sub-band in the receiver bandwidth and when samples of the L-LTF is received, performing a second angle based autocorrelation to determine second autocorrelations;
correcting the first and second autocorrelation of each sub-band using one or more of a coarse and fine carrier frequency offset (CFO) associated with the L-STF and L-LTF respectively, the fine CFO determined based on the crude bandwidth pattern estimate;
refining the crude bandwidth pattern estimate based on the corrected first and second autocorrelation of each sub-band by determining a group of sub-bands which maximizes a magnitude based on the corrected first and second autocorrelations for one or more sub-bands to form a refined bandwidth pattern estimate; and
decoding one or more signal fields and one or more data fields of the received signal based on the refined bandwidth pattern estimate, wherein the one or more signal fields comprise the L-SIG.

2. The method of claim 1, wherein performing the first angle-based autocorrelation and second angle-based autocorrelation is based on phasors of samples of the wireless signal.

3. The method of claim 1, wherein performing the first angle based autocorrelation and second angle based autocorrelation comprises performing autocorrelation over a duration of the L-STF and L-LTF respectively.

4. The method of claim 1, further comprising disqualifying sub-bands which include signals other than signals of interest in the received signal.

5. The method of claim 1, wherein determining the group which maximizes the magnitude based on the first autocorrelation for one or more sub-bands comprises identifying that the group optimally maximizes the magnitude.

6. The method of claim 5, wherein the refined bandwidth pattern is a sequence of bits where a first value of a bit indicates that a sub-band is in the maximizing group and a second value of the bit indicates that a sub-band is not in the maximizing group.

7. The method of claim 1, wherein determining the group which maximizes the magnitude based on the first autocorrelations for one or more sub-bands comprises identifying that the group sub-optimally maximizes the magnitude.

8. The method of claim 1, wherein refining the crude bandwidth pattern estimate comprises summing the corrected first and second autocorrelations for a same sub-band.

9. The method of claim 1, further comprising determining a signal-to-noise ratio for an antenna based on the crude bandwidth pattern estimate or refined bandwidth pattern estimate.

10. The method of claim 1, wherein performing the first angle based autocorrelation comprise for each antenna performing the first angle based autocorrelation, the method further comprising combining the first autocorrelation for the same sub-band and associated with each antenna based on the signal-to-noise ratio of the antenna to determine a first autocorrelation per sub-band for the plurality of antenna.

11. A bandwidth pattern estimation circuit comprising:
a receiver interface arranged to receive a wireless signal comprising a plurality of fields including a legacy short training field (L-STF), legacy long training field (L-LTF), and legacy signal (L-SIG) field transmitted to a plurality of antenna of a wireless receiver;
an STF autocorrelator arranged to perform for each sub-band in a receiver bandwidth and when samples of the L-STF is received a first angle based autocorrelation to determine first autocorrelations;
a first bandwidth pattern estimator arranged to form a plurality of groups of sub-bands to determine a group which maximizes a magnitude based on the first autocorrelations for one or more sub-bands, the group defining a crude bandwidth pattern estimate which identifies sub-bands over which the fields of the signal are transmitted;
an LTF autocorrelator arranged to perform for each sub-band in the receiver bandwidth and when samples of the L-LTF is received a second angle based autocorrelation to determine second autocorrelations and correct the first and second autocorrelation of each sub-band using one or more of a coarse and fine carrier frequency offset (CFO) associated with the L-STF and L-LTF respectively, the fine frequency offset determined based on the crude bandwidth pattern estimate;
a second bandwidth pattern estimator arranged to refine the crude bandwidth pattern estimate based on the corrected first and second autocorrelation of each sub-band by determining a group of sub-bands which maximizes a magnitude based on the corrected first and second autocorrelations for one or more sub-bands to form a refined bandwidth pattern estimate; and
a decoder arranged to decode one or more signal fields and one or more data fields of the received signal based on the refined bandwidth pattern estimate, wherein the one or more signal fields comprise the L-SIG.

12. The bandwidth pattern estimation circuit of claim 11, wherein the STF and LTF autocorrelator arranged to perform the first autocorrelation and second autocorrelation is based on phasors of samples of the wireless signal.

13. The bandwidth pattern estimation circuit of claim 11, wherein the STF autocorrelator and LTF autocorrelator arranged to perform the first angle based autocorrelation and second angle based autocorrelation comprises performing the autocorrelation over a duration of the L-STF and L-LTF respectively.

14. The bandwidth pattern estimation circuit of claim 11, wherein the first bandwidth pattern estimator is arranged to disqualify sub-bands which include signals other than signals of interest in the received signal.

15. The bandwidth pattern estimation circuit of claim 11, wherein determining the group which maximizes the magnitude based on the first autocorrelation for one or more sub-bands comprises identifying that the group optimally maximizes the magnitude.

16. The bandwidth pattern estimation circuit of claim 15, wherein the refined bandwidth pattern is a sequence of bits where a first value of a bit indicates that a sub-band is in the maximizing group and a second value of the bit indicates that a sub-band is not in the maximizing group.

17. The bandwidth pattern estimation circuit of claim 11, wherein the first bandwidth pattern estimator arranged to determine the group which maximizes the magnitude based on the first autocorrelation for one or more sub-bands comprises the first bandwidth pattern estimator arranged to identify that the group sub-optimally maximizes the magnitude.

18. The bandwidth pattern estimation circuit of claim 11, wherein the second bandwidth pattern estimator arranged to refine the crude bandwidth pattern estimate comprises the second bandwidth pattern estimator arranged to sum the corrected first and second angle based autocorrelation for a same sub-band.

19. The bandwidth pattern estimation circuit of claim 11, wherein the first bandwidth pattern estimator is arranged to determine a signal-to-noise ratio for an antenna based on the crude bandwidth pattern estimate or refined bandwidth pattern estimate.

20. The bandwidth pattern estimation circuit of claim 19, wherein the STF correlator arranged to perform the first angle based autocorrelation is further arranged to perform for each antenna the first angle based autocorrelation and the second bandwidth pattern estimator is further arranged to combine the first autocorrelation for the same sub-band and associated with each antenna based on the signal-to-noise ratio of the antenna to determine a first autocorrelation per sub-band for the plurality of antenna.

* * * * *